UNITED STATES PATENT OFFICE.

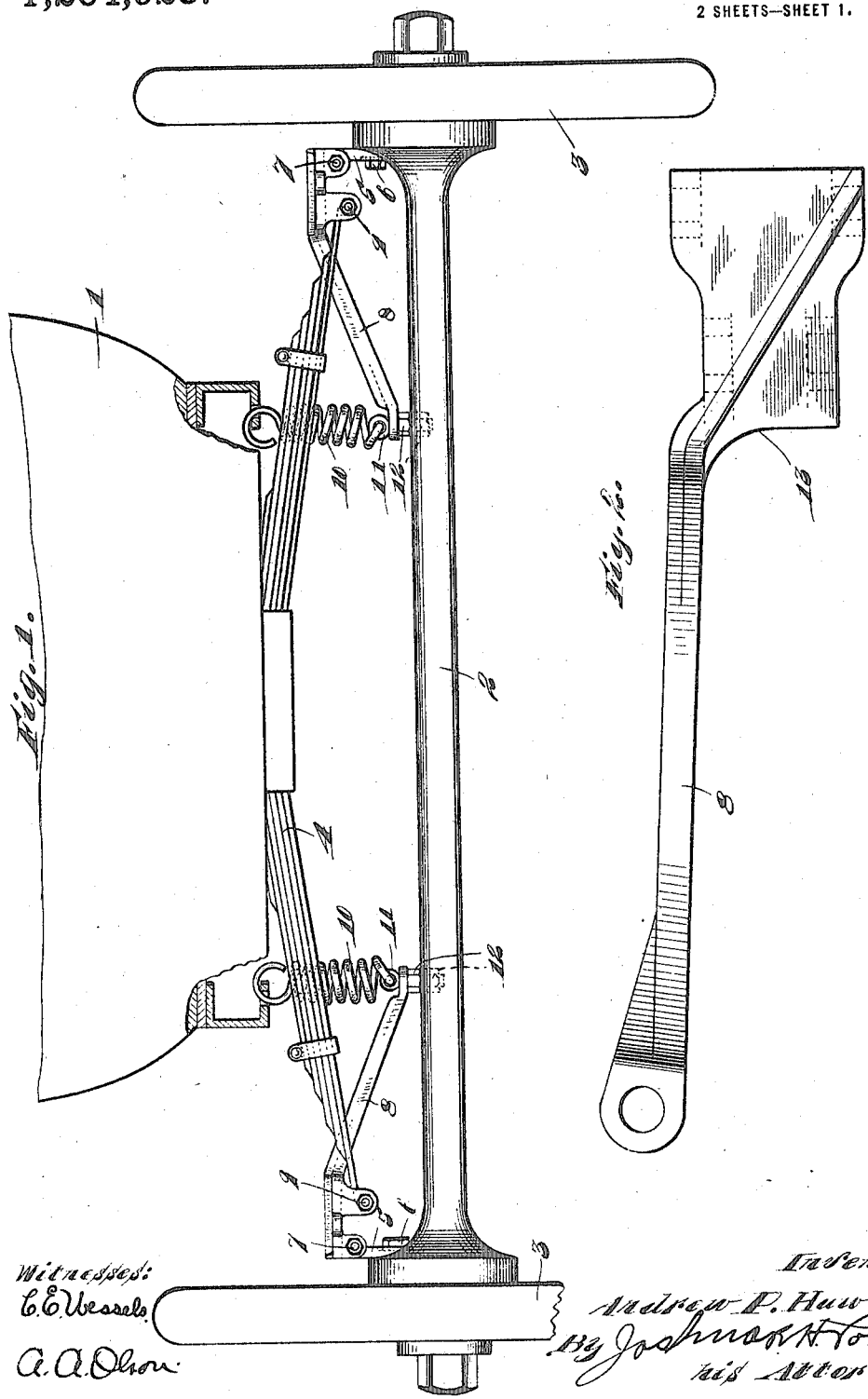

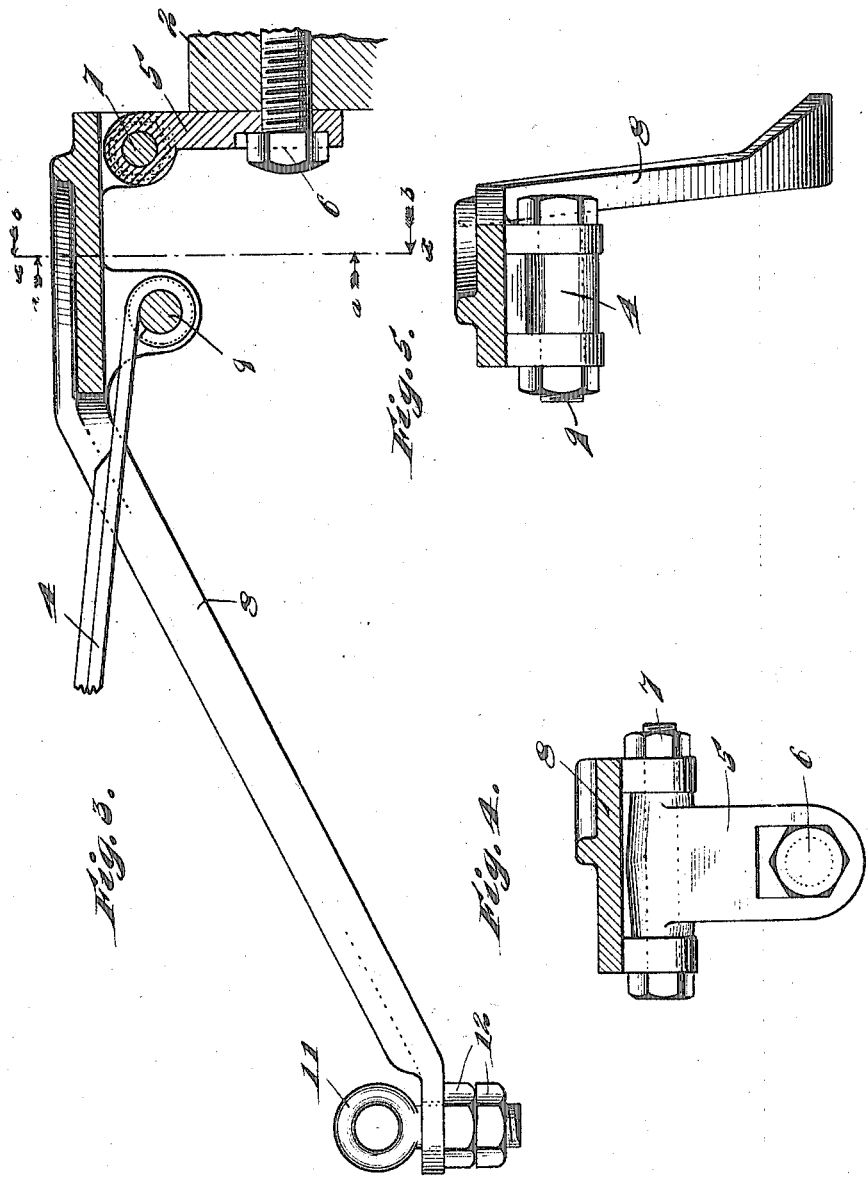

ANDREW P. HAWN, OF GOODLAND, INDIANA, ASSIGNOR, BY DIRECT AND MESNE ASSIGNMENTS, TO THE H. & D. COMPANY, OF GOODLAND, INDIANA, A CORPORATION OF INDIANA.

SHOCK-ABSORBER.

1,264,923.

Specification of Letters Patent.

Patented May 7, 1918.

Application filed July 8, 1914. Serial No. 849,666.

*To all whom it may concern:*

Be it known that I, ANDREW P. HAWN, a citizen of the United States, and a resident of the city of Goodland, county of Newton, and State of Indiana, have invented certain new and useful Improvements in Shock-Absorbers, of which the following is a specification.

My invention relates to improvements in shock absorbers for vehicles, and has for its object the production of a device of this character which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a partially sectional rear elevation of a vehicle equipped with shock absorbing devices embodying my invention, Fig. 2 is an enlarged top plan view of one of the levers included in the shock absorber detached, Fig. 3 is a sectional side elevation of one of said levers showing the connection thereof with the base of the vehicle and the leaf spring of the body of the vehicle, Fig. 4 is a section taken on line $x$—$x$ of Fig. 3, looking in the direction of arrows $a$—$a$, and Fig. 5 is a section taken on line $x$—$x$ of Fig. 3, looking in the direction of arrows $b$—$b$.

The preferred form of construction as illustrated in the drawings is applied to an automobile comprising a body 1 and a wheeled base, the latter comprising axles 2 (one only being shown in the drawings) and wheels 3 mounted upon said axles. At the under side of body 1 is provided the usual bowed leaf spring 4 disposed transversely of said body.

Arising from the base of the vehicle at either side thereof are stools 5, the lower ends of which are secured rigidly by bolts 6 to the ends of axles 2. Fulcrumed at 7 to the upper end of each of the stools 5 is an inwardly projecting lever 8. Each of the levers 8 is pivotally connected intermediate its extremities but adjacent the fulcrum 7 thereof, as at 9 with the adjacent end of spring 4. Said levers 8 are formed at their outer ends with depending spaced lugs, as shown, for the accommodation of the connecting pins employed at the points 7 and 9, as just described.

The inner end of each lever 8 is bent downwardly and is connected by means of a helical tension spring 10 with the under side of vehicle body 1. The connection between the lower end of each spring 10 and the corresponding lever 8 is effected by means of eye bolt 11 which passes through the perforated inner end of the lever, being secured to the latter by means of nuts 12. In order to afford clearance for the ends of spring 4, in the connection of the latter with levers 8, the latter are offset as at 13, as clearly shown in Fig. 2. Also, in order to lend strength and rigidity to the outer ends of said levers, the same are of ribbed construction at this location, as shown in the several views.

With a construction as set forth, it will be seen that the weight of the vehicle body will be borne by the pivots 9 intermediate the ends of levers 8. This downward pressure upon said levers will be counteracted by the upward pressure exerted upon the inner ends of said levers by the springs 10, the latter therefore indirectly serving to support the vehicle body. By positioning the points of engagement of the ends of spring 4 with the levers 8, adjacent the fulcrums of the latter, so that the distance between said points of connection and the inner extremities of said levers is considerably greater than the distance between the points 9 and the fulcrums 7, great leverage is developed which permits of comparatively light springs 10 being employed. This, of course, results in an economical construction, the springs 10, because of their lightness being of low cost. Also, by reason of the lightness of springs 10, a shock absorber is produced which is very sensitive, being adapted to respond under the smallest shock or jar, and thus conduce to comfort and ease to the occupants of the vehicle, when in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A shock absorber for vehicles comprising a vehicle spring, a connecting device and a lever, the connecting device connected at one end to the vehicle body and at its other end to one end of the lever, the other end of the lever pivotally connected to the vehicle axle, the vehicle spring connected to the vehicle body and at one end to the lever intermediate its ends, the vehicle spring and lever arranged so that the prolongation of the vehicle spring in its normal position lies beneath the pivot point of the lever.

2. A shock absorber for vehicles comprising a vehicle spring, an elastic connecting device and a lever, the elastic connecting device connected at one end to the vehicle body and at its other end to one end of the lever, the other end of the lever pivotally connected to the vehicle axle, the vehicle spring connected to the vehicle body and at one end to the lever intermediate its ends, the vehicle spring and lever arranged so that the prolongation of the vehicle spring in its normal position lies beneath the pivot point of the lever.

3. A shock absorber for vehicles comprising a vehicle spring, a connecting device and a lever, the connecting device connected at one end to the vehicle body and at its other end to one end of the lever, the other end of the lever pivotally connected to the vehicle axle, the vehicle spring connected to the vehicle body and at one end to the lever intermediate its ends, said connecting device and lever at the point where they are connected being unconnected with any other part which might prevent the free movement of the point of connection in any direction.

4. A shock absorber for vehicles comprising a vehicle spring, an elastic connecting device and a lever, the elastic connecting device connected at one end to the vehicle body and at its other end to one end of the lever, the other end of the lever pivotally connected to the vehicle axle, the vehicle spring connected to the vehicle body and at one end to the lever intermediate its ends, said elastic connecting device and lever at the point where they are connected being unconnected with any other part which might prevent the free movement of the point of connection in any direction.

5. A shock absorber for vehicles comprising a vehicle spring, a connecting device and a lever, the connecting device connected at one end to the vehicle and at its other end to one end of the lever, the other end of the lever pivotally connected to the vehicle axle, the vehicle spring connected to the vehicle body and at one end to the lever intermediate its ends, said lever and spring inclined in opposite directions to the horizontal and crossing each other.

6. A shock absorber for vehicles comprising a vehicle spring, a connecting device and a lever, the connecting device connected at one end to the vehicle and at its other end to one end of the lever, the other end of the lever pivotally connected to the vehicle axle, the vehicle spring connected to the vehicle body and at one end to the lever intermediate its ends, said lever and spring inclined in opposite directions to the horizontal, the inner end of the lever being below the vehicle spring and the outer end of the lever being above the line of the vehicle spring.

7. A shock absorber for vehicles comprising a vehicle spring, a connecting device and a lever, the connecting device connected at one end to the vehicle and at its other end to one end of the lever, the other end of the lever pivotally connected to the vehicle axle, the vehicle spring connected to the vehicle body and at one end to the lever intermediate its ends, said lever and spring inclined in opposite directions to the horizontal and crossing each other, the inner end of the lever being below the vehicle spring and the outer end of the lever being above the line of the vehicle spring.

8. A shock absorber for vehicles comprising a vehicle spring, a connecting device and a lever, the connecting device connected at one end to the vehicle and at its other end to one end of the lever, the other end of the lever pivotally connected to the vehicle axle, the vehicle spring connected to the vehicle body and at one end to the lever intermediate its ends, the outer end of said lever being located in the same vertical plane as the vehicle spring and the inner end of the lever having a point of connection with the connecting device at one side of such vertical plane.

9. A shock absorber for vehicles comprising a vehicle spring, an elastic connecting device and a lever, the elastic connecting device connected at one end to the vehicle and at its other end to one end of the lever, the other end of the lever pivotally connected to the vehicle axle, the vehicle spring connected to the vehicle body and at one end to the lever intermediate its ends, the outer end of said lever being located in the same vertical plane as the vehicle spring and the inner end of the lever having a point of connection with the connecting device at one side of such vertical plane 10. A shock absorber for vehicles comprising a vehicle spring, a connecting device and a lever, the connecting device connected at one end to the vehicle body and at its other end to one end of the lever, the other end of the lever pivotally connected to the vehicle axle, the vehicle spring connected to the vehicle body and at one end to the lever intermediate its ends, the outer end of said lever being located in the same vertical plane as the vehicle spring and the inner end of the lever having a point of connection with the connecting device at one side of such vertical plane.

11. A shock absorber for vehicles comprising a vehicle spring, an elastic connecting device and a lever, the elastic connecting device connected at one end to the vehicle body and at its other end to one end of the lever, the other end of the lever pivotally connected to the vehicle axle, the vehicle spring connected at one end to the vehicle body and at the other to the lever intermediate its ends, the outer end of said lever being located in the same vertical plane as the vehicle spring and the inner end of the lever being placed at one side of such vertical plane.

12. A shock absorber for vehicles comprising a lever attached at one end to the vehicle wheel supporting structure and intermediate its ends to the vehicle spring and formed at its other end to swing alongside of and below said vehicle spring, and a contractile spring connected to the last mentioned end and attached to a portion of the vehicle body.

13. A shock absorber for vehicles comprising a lever attached at one end to the vehicle wheel supporting structure and intermediate its ends to the vehicle spring and formed at its other end to swing alongside of and below said vehicle spring, and a contractile spring for resisting such swing.

14. A shock absorber for vehicles comprising a lever attached at one end to the vehicle wheel supporting structure and intermediate its ends to the vehicle spring and formed at its other end to swing alongside of and below the vehicle spring, and a contractile spring connected to the last mentioned end for resisting such swing, said last mentioned end being otherwise unattached.

15. In a vehicle, the combination with the vehicle axle and the vehicle spring, of a shock absorber at each end of the axle, each shock absorber comprising a lever attached at one end to the axle and intermediate its ends to the vehicle spring and formed at its other end to swing alongside of and past the vehicle spring, and a contractile spring connected to each lever for resisting such swing, said shock absorbers acting independently of each other.

16. In a vehicle, the combination with the vehicle axle and the vehicle spring, of a shock absorber at each end of the axle, each shock absorber comprising a lever attached at one end to the axle and intermediate its ends to the vehicle spring and formed at its other end to swing alongside of and past the vehicle spring, and a contractile spring connected to the last mentioned end of each lever and attached to a portion of the vehicle body, said shock absorbers acting independently of each other.

17. A shock absorber for vehicles comprising a lever attached at one end to the vehicle wheel supporting structure and intermediate its ends to the vehicle spring and formed at its other end to swing vertically past the vehicle spring, and auxiliary spring means yieldingly connecting such other end to a portion of the vehicle body.

In testimony whereof I have signed my name to this specification in the presence of two subscribing witnesses.

ANDREW P. HAWN.

Witnesses:
A. G. JACKWAY,
E. A. PERKINS.